(12) United States Patent
A et al.

(10) Patent No.: US 11,265,204 B1
(45) Date of Patent: Mar. 1, 2022

(54) USING A PROGRAMMABLE RESOURCE DEPENDENCY MATHEMATICAL MODEL TO PERFORM ROOT CAUSE ANALYSIS

(71) Applicant: Juniper Networks, Inc., Sunnyvale, CA (US)

(72) Inventors: Chandrasekhar A, Bangalore (IN); Jayanthi R, Coimbatore (IN); Javier Antich, Valencia (ES)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/947,507

(22) Filed: Aug. 4, 2020

(51) Int. Cl.
*H04L 12/24* (2006.01)
*H04L 41/0631* (2022.01)
*H04L 41/142* (2022.01)

(52) U.S. Cl.
CPC ........ *H04L 41/0631* (2013.01); *H04L 41/142* (2013.01)

(58) Field of Classification Search
CPC ... H04L 41/0631; H04L 41/142; H04L 43/04; H04L 43/0852
See application file for complete search history.

(56) References Cited

U.S. PATENT DOCUMENTS

| | | | |
|---|---|---|---|
| 6,154,849 A | 11/2000 | Xia | |
| 6,336,138 B1 | 1/2002 | Caswell et al. | |
| 7,552,447 B2 | 6/2009 | Uthe | |
| 7,945,817 B1 | 5/2011 | Usery et al. | |
| 10,148,506 B1 | 12/2018 | Anburose et al. | |
| 10,200,248 B1 | 2/2019 | Jiang et al. | |
| 10,200,252 B1 | 2/2019 | Qin et al. | |
| 10,333,820 B1 | 6/2019 | Wang et al. | |
| 10,516,761 B1 | 12/2019 | A et al. | |
| 2004/0049509 A1 | 3/2004 | Keller et al. | |
| 2005/0137762 A1 | 6/2005 | Rother | |

(Continued)

FOREIGN PATENT DOCUMENTS

| | | |
|---|---|---|
| EP | 1405187 A1 | 4/2004 |
| EP | 2961100 A1 | 12/2015 |
| WO | 2013/055760 A1 | 4/2013 |

OTHER PUBLICATIONS

Piao, "Root Cause Analysis and Proactive Problem Prediction for Self-Healing", 2007 international Conference on Convergence Information Technology, Nov. 21, 2007.*
Bjorklund, "YANG—A Data Modeling Language for the Network Configuration Protocol (NETCONF)," Internet Engineering Task Force (IETF), RFC 6020, Oct. 2010, 173 pp.
Clemm et al. "A Yang Data Model for Network Topologies" Internet Engineering Task Force (IETF) RFC 8345, Mar. 2018, 57 pp.

(Continued)

*Primary Examiner* — Todd L Barker
(74) *Attorney, Agent, or Firm* — Shumaker & Sieffert, P.A.

(57) ABSTRACT

A controller device manages a plurality of network devices. The controller device includes a memory configured to store a dependency model representing dependencies between resources provided by the network devices and a programmed merge strategy, and one or more processors implemented in circuitry and configured to: determine the resources provided by the network devices; determine relationships between the resources according to the programmed merge strategy; construct the dependency model using the determined relationships; determine that at least one of the resources has experienced a failure; and perform a root cause analysis using the dependency mathematical model to determine a root cause of the failure of the at least one of the resources.

18 Claims, 6 Drawing Sheets

(56) References Cited

U.S. PATENT DOCUMENTS

| | | |
|---|---|---|
| 2005/0278273 A1 | 12/2005 | Uthe |
| 2008/0222287 A1 | 9/2008 | Bahl et al. |
| 2010/0115341 A1 | 5/2010 | Baker et al. |
| 2010/0138694 A1 | 6/2010 | Harrison et al. |
| 2011/0231704 A1 | 9/2011 | Ge et al. |
| 2012/0005532 A1 | 1/2012 | Li et al. |
| 2015/0003595 A1 | 1/2015 | Yaghi et al. |
| 2015/0199226 A1 | 7/2015 | Wu et al. |
| 2016/0275202 A1* | 9/2016 | Lee .................. G06F 16/2365 |
| 2017/0075744 A1 | 3/2017 | Deshpande et al. |
| 2017/0372212 A1 | 12/2017 | Zasadzinski et al. |
| 2017/0372323 A1 | 12/2017 | Stern et al. |
| 2018/0039567 A1* | 2/2018 | Rajagopalan ....... G06F 11/3672 |
| 2018/0218264 A1 | 8/2018 | Renders et al. |
| 2018/0278496 A1* | 9/2018 | Kulshreshtha ........ H04L 41/145 |
| 2019/0230003 A1 | 7/2019 | Gao et al. |
| 2019/0327154 A1* | 10/2019 | Sahoo .................. H04L 41/145 |
| 2020/0136891 A1* | 4/2020 | Mdini ..................... H04L 43/16 |
| 2020/0409781 A1 | 12/2020 | Zhen et al. |

OTHER PUBLICATIONS

Harrington et al., "An Architecture for Describing Simple Network Management Protocol (SNMP) Management Frameworks," Network Working Group, RFC 3411, Dec. 2002, 64 pp.

Schoenwaelder, "Common YANG Data Types" Internet Engineering Task Force (IETF), RFC 6991, Jul. 2013, 30 pp.

U.S. Appl. No. 16/731,372, filed Dec. 31, 2019, naming inventors Chandrasekhar et al.

U.S. Appl. No. 16/821,745, filed Mar. 17, 2020, naming inventors Jayanthi et al.

U.S. Appl. No. 16/946,994, filed Jul. 14, 2020, naming inventors Jayanthi et al.

U.S. Appl. No. 17/032,799, filed Sep. 25, 2020, naming inventors Grammel et al.

Enns, "NETCONF Configuration Protocol," Network Working Group, RFC 4741, Dec. 2006, 95 pp.

Extended Search Report from counterpart European Application No. 20204106.7, dated Apr. 16, 2021, 11 pp.

Dusia et al., "Recent Advances in Fault Localization in Computer Networks," IEEE Communications Surveys & Tutorials, May 18, 2016, pp. 3030-3051.

\* cited by examiner

US 11,265,204 B1

USING A PROGRAMMABLE RESOURCE DEPENDENCY MATHEMATICAL MODEL TO PERFORM ROOT CAUSE ANALYSIS

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred herein as a controller or controller device, may be configured to translate high-level configuration (intents received from an administrator for a plurality of managed network devices) to low-level configuration (to be applied to the managed network devices themselves). In some instances, the controller device may maintain backups of configurations (e.g., low-level configurations) based on intents, such that the controller device may restore a managed network device to a previous state (e.g., after the network enters a bad state). In some instances, new intents provided by an administrator to the controller device may create a conflict that may impact the functionality of one or more existing intents, which the controller device may detect before deploying the intent to one or more managed network devices—avoiding putting the network in a bad state.

In one example, a method includes determining, by a controller device that manages a plurality of network devices, resources provided by the network devices; determining, by the controller device, relationships between the resources according to a programmed merge strategy; constructing, by the controller device, a dependency model representing dependencies between the resources using the determined relationships; determining, by the controller device, that at least one of the resources has experienced a failure; and performing, by the controller device, root cause analysis using the dependency mathematical model to determine a root cause of the failure of the at least one of the resources.

In another example, a controller device that manages a plurality of network devices includes a memory configured to store a dependency model representing dependencies between resources provided by the network devices and a programmed merge strategy; and one or more processors implemented in circuitry and configured to: determine the resources provided by the network devices; determine relationships between the resources according to the programmed merge strategy; construct the dependency model using the determined relationships; determine that at least one of the resources has experienced a failure; and perform a root cause analysis using the dependency mathematical model to determine a root cause of the failure of the at least one of the resources.

In another example, computer-readable storage medium has stored thereon instructions that, when executed, cause a processor of a controller device that manages a plurality of network devices to determine resources provided by the network devices; determine relationships between the resources according to a programmed merge strategy; construct a dependency model representing dependencies between the resources using the determined relationships; determine that at least one of the resources has experienced a failure; and perform a root cause analysis using the dependency mathematical model to determine a root cause of the failure of the at least one of the resources.

The details of one or more examples are set forth in the accompanying drawings and the description below. Other features, objects, and advantages will be apparent from the description and drawings, and from the claims.

DETAILED DESCRIPTION

Figure 1:
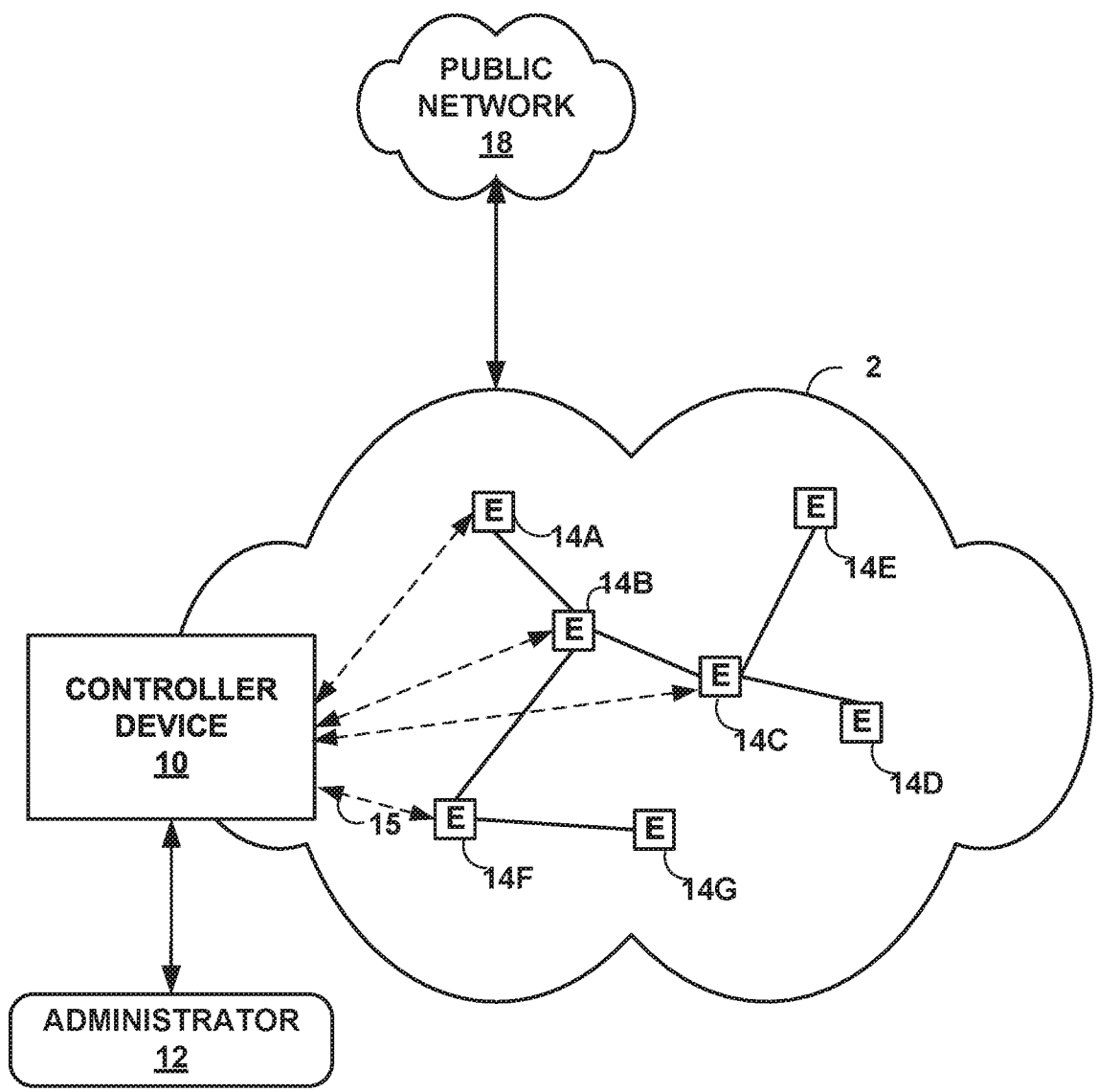
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from administrator 12 representing any or all of create, update, and/or delete actions with respect to the intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources. Customer environments may be configured to allow customers (e.g., administrators 12) to control intent realization and assure programmed intents. In some examples, controller device 10 may construct a graph data model by querying elements 14 to determine resources provided by elements 14. Controller device 10 may generally be configured with information representing types of resources provided by each of elements 14, but may query elements 14 to determine specific resource information for resources matching each of the types of resources provided by elements 14. Types of resources may include, for example, forwarding tables, routing tables, network access policies (e.g., for access by certain users, firewall policies, or the like), or other such resources.

In accordance with the techniques of this disclosure, controller device 10 may further be configured to transform a topology model to a unified network model, and then use the unified network model to perform root cause analysis (RCA) of various network problems, such as device or resource faults or failures. The unified network model is a model that contains data representing network resources, which are partly managed by domain controllers, such as controller device 10. For example, controller device 10 may represent an IP/MPLS controller, an optical controller, or an application controller, and the unified network model may be a traffic engineering model.

This disclosure recognizes that the number of network connected devices, such as Internet of Things (IoT) devices, has recently increased rapidly. The need for large data centers to host cloud and web applications has led to a need for mechanisms to effectively control complex, heterogeneous, and distributed networks of devices. These rapidly developing network systems require distributed and fast diagnosis solution techniques to analyze dependent events.

In any complex network, a breakdown in the underlying layer of the network can cause a large number of higher layer services to fail, which may or may not be directly connected to the failing component. There are various techniques that have been proposed to provide RCA. Techniques for correlating events and identifying the root cause of the issue include model traversing techniques and dependency graph techniques.

The model traversing technique uses object models to determine fault propagation. A network is represented with various components and relations. Based on the model, fault dependencies can be inferred and used to identify the root cause of the issue. Unlike fault propagation models, such as dependency graphs, model traversing techniques do not specify fault dependencies directly, but rather, allow for derivation of the fault dependencies from the model during run time. This is beneficial for a network with frequent changes, but does not provide for more complex fault propagation scenarios, because it is assumed that only one issue occurred at a particular time.

The dependency graph technique involves the use of a dependency graph, which is a directed graph that models dependencies between managed objects. In the case of a network, nodes of the graph represent network elements (e.g., hosts), and an edge from node A to node B indicates that failures in node A can cause failures in node B, because node B depends on node A. A dependency graph is best suited for networks with infrequent changes. Networks with frequent changes require continual updates to the dependencies.

Controller device 10 may be configured to use a combination of model traversing techniques and dependency graph techniques, as discussed in greater detail below. Furthermore, a user, such as administrator 12, may define resources and resource discovery, to customize controller device 10 based on the customer environment, to perform a model driven RCA solution. Once controller device 10 discovers the resources, controller device 10 may build a resource dependency mathematical model that allows discovery of dependencies across the resources. The resource dependency mathematical model provides relations between cause and effect dependency of resources.

This disclosure further recognizes that a model driven RCA may use a unified network model in mathematical form to express dependencies. Domain controllers, such as controller device 10, may discover the network model, and element management systems (EMSs) may perform inventory services to discover device level resources. This disclosure describes an approach for transforming a network topology model and inventory resources to the unified network model in mathematical form. The network model may include frequently changing transient models, such as dynamic label switched paths (LSPs). Controller device 10 may use the techniques of this disclosure to address these transient states. For example, controller device 10 may use a resource mathematical model discovery pipeline, as discussed in more detail below.

In order to support a programmable resource mathematical model discovery technique, controller device 10 may provide an interface by which administrator 12 may program a resource model (including device and network resources), a resource discovery rule, and a resource merge strategy. Controller device 10 may further generate a graph database model based on the defined resources. Controller device 10 may also use a discovery pipeline to transform the topology model to the unified network model. Controller device 10 may persist transformed resources, execute the merge strategy to build dependency edges between resources, build the dependency mathematical model, handle transient state changes, and provide resynchronization support. When underlying resources are changed, controller device 10 may merge the changes.

Controller device 10 may be an existing, previously deployed controller device in a customer's network. Controller device 10 may maintain resources in a local model. According to the techniques of this disclosure, controller device 10 may be a domain specific controller configured to synchronize resources to build a common resource database and a corresponding mathematical model.

In general, controller device 10 may provide programmability support for resources as part of a playbook. Once the playbook is applied, controller device 10 may transform data representing the resources and build relationships across the resources, based on a programmed merge strategy. After discovering the resources, controller device 10 may build a resource dependency mathematical model (also referred to as a dependency mathematical model) that allows for determination of cause and effect dependencies across the resources. Controller device 10 may construct the dependency mathematical model as follows. First, controller device 10 may populate relation/dependency edges between the resources, where dependency edges may be across device resources, across device resources to services, and across services. Based on this model, controller device 10 may build the dependency mathematical model, which provides cause and effect relationships of the resources.

Figure 2:
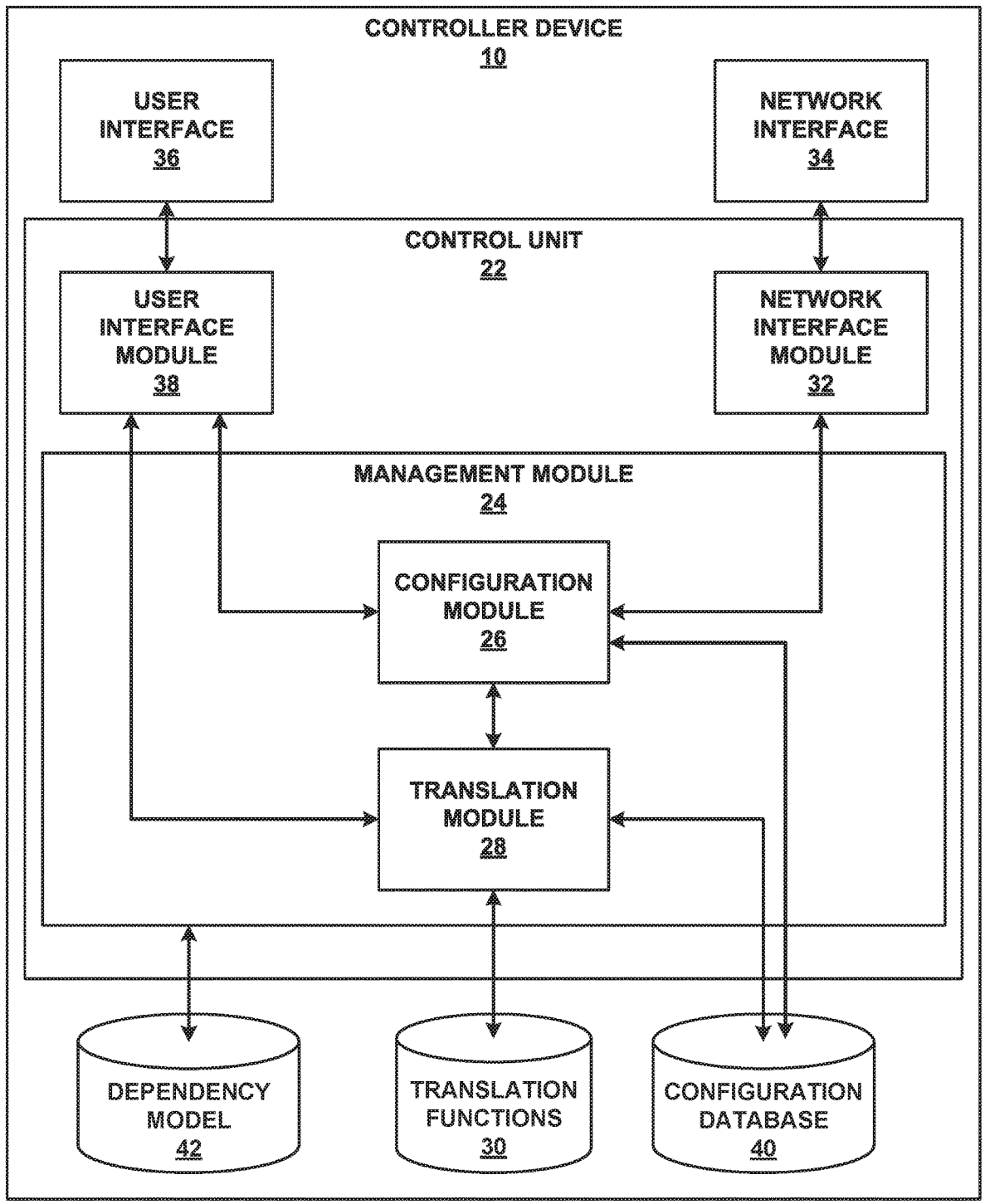
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive intents (e.g., high-level configuration instructions) for a set of managed network devices from a user, such as administrator 12. Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores device-level configuration information based on intents (e.g., high-level configuration information, or in some cases, both high-level configuration and low-level configuration information) for the managed devices (e.g., elements 14).

Translation module 28 determines which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, it should be understood that other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Controller device 10 further stores data representing resources provided by elements 14 (FIG. 1) in configuration database 40. The resources may include, for example, network services, hardware and/or software units, and tables of elements 14. Thus, the resources may include, for example, network tunnels (such as label switched paths (LSPs)), virtual private networks (VPNs), virtual routing and forwarding (VRF) tables, hardware interfaces, logical interfaces, or the like. Controller device 10 may be configured with a playbook, which administrator 12 (FIG. 1) can use to program the various resources. The playbook may contain a set of resource definitions, resource discovery rules, and a resource merge strategy.

An example set of data for a playbook is shown below:

```
{
topic model bng {
    description "Models related to JUNOS Broadband Network Gateway (BNG)";
    synopsis "BNG based models";
    function interface-to-vrf {>>>function definition
        description "function merges the interface to vrf";
        Path interface_to_vrf.py;
        Method map_interface;
        argument intf_name
            mandatory;
        }
        argument vrf_name
            mandatory;
        }
    }
}
resource interface {
    type device-resource; >>>Type of the resource
    keys [interface-name];
    synopsis "Interface model";
    description "This model captures the Interface information";
    field interface-name {.>>>>Fields in the model
        type string;
        description "Interface Name";
    }
    field mtu{
        type integer;
        description "MTU";
    }
    discovery-rule-settings {>>>Resource discovery rule
        rule snmp-interface.rule;
    }
}
resource logical_interface {
    keys [name];
    type device-resource;
    synopsis "Logical Interface model";
    description "This model captures the Logical Interface information";
    field name {
        type string;
        description "Logical Interface Name";
    }
}
resource vrf {
    type device-resource;
    keys [name];
    synopsis "VRF model";
    description "This model captures the VRF information";
    field name {
        type string;
        description "VRF Name";
    }
    depends [{>>>Dependency population
        resource-type: interface,
        merge-strategy {
            function interface-to-vrf;
            argument intf_name "interface.$ interface-name";
            argument vrf_name "vrf.$ vrf-name";
        }
    }]
}
resource LSP {
    type device-resource;
    keys [name];
    synopsis "LSP model";
    description "This model captures the VRF information";
    field name {
```

```
        type string;
        description "VRF Name";
      }
      depends [{>>>Dependency population
        resource-type: interface,
        Dependency-type: transient, >>>Transient dependency
        merge-strategy {
          function interface-to-vrf;
          argument intf_name "interface.$ interface-name";
          argument vrf_name "vrf.$ vrf-name";
        }
      }]
    }
    resource VPN {
      type network-resource; >>>Network-resource
      depends: {interface}>>>dependency
      keys [name];
      synopsis "VPN model";
      description "This model captures the VPN information";
      field name {
        type string;
        description "VRF Name";
      }
    }
  }
}
```

Furthermore, an example interface discovery rule for the playbook is shown below:

```
Playbook {
  topic interface.discovery {
    description "This topic is to discover interface";
    synopsis "Interface discovery";
    rule interface-discovery {
      keys interface-name;
      description "discover interfaces";
      sensor interface {
        synopsis "Interface open-config sensor definition";
        description "interfaces open-config sensor to collect
          telemetry data from network
          device";
        open-config {
          sensor-name /interfaces/;
          frequency 10s;
        }
      }
      field interface-name {
        sensor interface {
          path "/interfaces/interface/@name";
        }
        type string;
        description "stores interface name";
      }
    }
  }
}
```

Table 1 below represents an example set of descriptions for the resources and attributes thereof:

TABLE 1

| Name | Description |
| --- | --- |
| Resource | Defines the Resource |
| Resource-type | Values: Device-resource, Network-resource |
| discovery-rule-settings | Captures the discovery of the resource |

TABLE 1-continued

| Name | Description |
| --- | --- |
| Depends | Capture the resource dependency |
| Merge-strategy | Defines the function that discovers the dependency among the resources |
| Dependency-type | Signifies whether it is Transient. Transient |

Management module 24 may automatically generate a database model (in the form of a graph) based on the resource definitions shown above. The graph for the database model may include a set of nodes, each node corresponding to a resource. The graph may further include edges between the nodes as discussed below. The database model may include fields according to Table 2 below:

TABLE 2

| Property | Description |
| --- | --- |
| Name | Name of the resource instance |
| Type | Type of the resource |
| Category | Category includes DeviceResource, Network resource |
| Properties | Properties of the resource defined as part of the playbook |
| Playbook name | Playbook instance name. This provides the name space for the resources discovered by the playbook execution. |

Management module 24 may form two types of edges between nodes representing resources in the graph for the database model. The two types of edges include dependency edges and parent-child edges. The dependency edge creates a reference edge between two resources. For the dependency edge, a referrer object contains a reference property. A parent-child edge (or contains edge) represents a parent-child relationship between corresponding resources. The parent object contains the children property.

Figure 3:
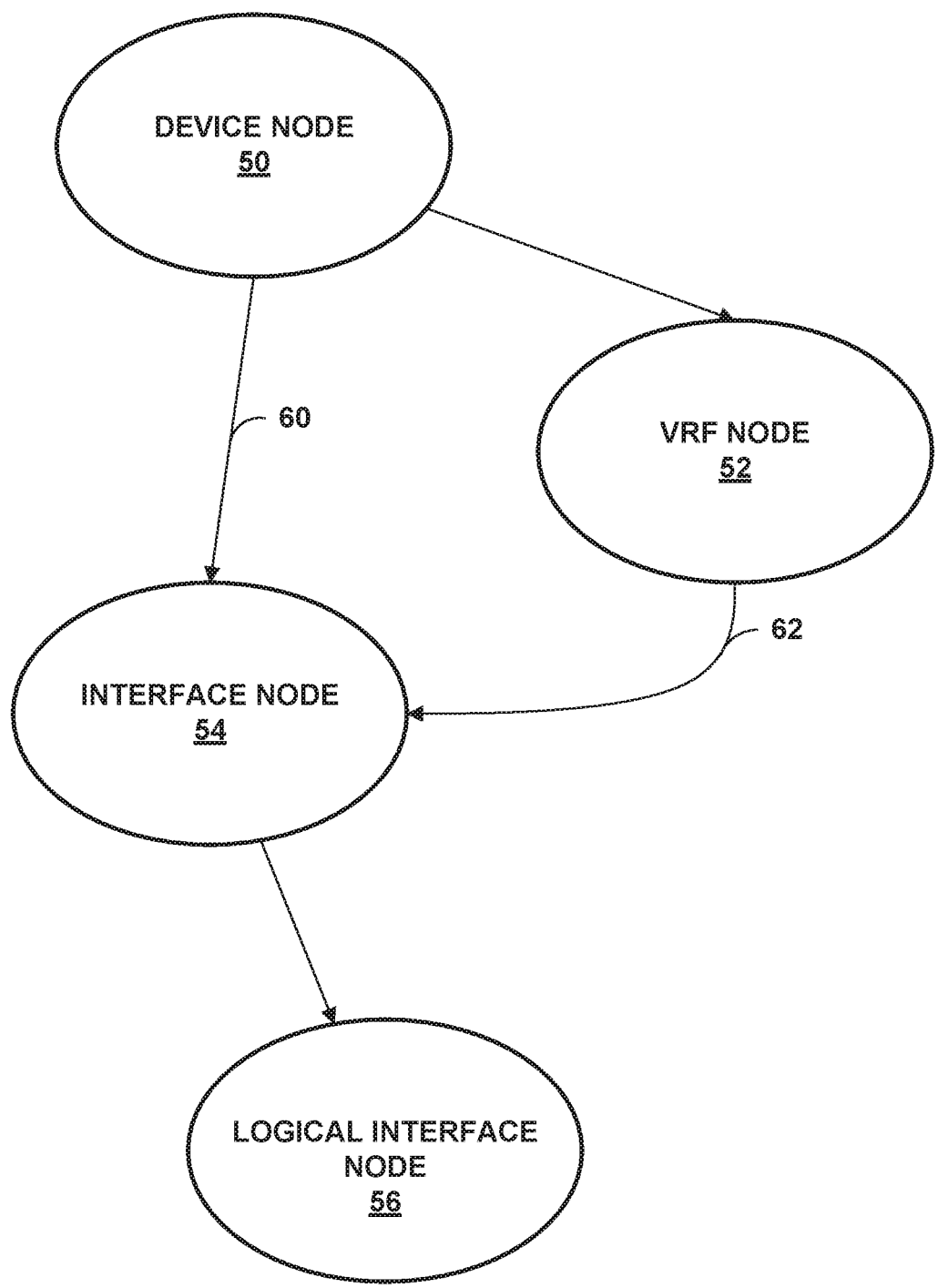
FIG. 3 is a conceptual diagram illustrating an example graph database model.

FIG. 3 is a conceptual diagram illustrating an example graph database model. In this example, the graph database model includes device node 50, virtual routing and forwarding (VRF) node 52, interface node 54, and logical interface node 56. In this example, the graph database model has contains edge 60 between device node 50 and interface node 54, indicating that the device corresponding to device node 50 includes (i.e., "has" or contains) an interface, that is, a physical interface, represented by interface node 54. In this example, the graph database model also has dependency edge 62 between VRF node 52 and interface node, representing that a VRF corresponding to VRF node 52 depends on the physical interface corresponding to interface node 54. Thus, a failure of the physical interface corresponding to interface node 54 may also cause a failure when using the VRF corresponding to VRF node 52.

Referring back to FIG. 2, controller device 10 and management module 24 thereof may execute a resource discovery pipeline. After initializing the playbook on a device/device group, management module 24 may use the resource discovery pipeline to generically handle any resources (e.g., to add nodes to the graph for the database model). The pipeline may include stages of resource management, dependency edge management between resources, and resource dependency mathematical model generation.

After discovering the resources, management module 24 may perform the resource management phase of the pipeline to build and update the parent-child relationships across the resources. Management module 24 may perform the following algorithm to build and update the parent-child relationships:

Check if the resource is transient.
If not transient:
Get the existing resources of the playbook.
Compare the resources with existing resources.
Create/update the resources.
Form the "updated resource ID list" and pass the ID list to the second stage.
If transient:
Decorate parent/child ID.
Pass the resource directly to the second stage.

After the resource discovery phase, management module 24 may perform the dependency edge management between resources phase. During this phase, management module 24 may add (or remove) resource dependency edges in the database model, between nodes corresponding to the resources. Management module 24 may build an association merge strategy according to the following algorithm:

Get the resources based on the updated resource ID list.
Based on the merge strategy rule, get the dependent resources
Run the merge strategy rule
Performance of this step includes adding/deleting dependency edges between the nodes representing resources in the graph for the database model.
Form an "updated associations list" and pass it to the next stage.
If the resource is a transient resource, build/update the relationships from the input stream.

Controller device 10 further includes dependency model 42. Dependency model 42 represents a resource dependency mathematical model according to the techniques of this disclosure. Management module 24 may construct dependency model 42 according to the techniques of this disclosure, and use a combination of dependency model 42 (that is, a dependency graph) and model traversing to perform root cause analysis (RCA), that is, to identify the root of a problem with various resources. RCA is described in greater detail in U.S. application Ser. No. 16/821,745, filed Mar. 17, 2020, the entire contents of which are hereby incorporated by reference. Similarly, failure impact analysis techniques, which controller device 10 may perform in addition or in the alternative to RCA (and using dependency model 42), is described in U.S. application Ser. No. 16/946,994, filed Jul. 14, 2020, the entire contents of which are hereby incorporated by reference. Moreover, model correlation for multi-layer analysis techniques, which controller device 10 may perform in addition to or in the alternative to RCA and/or failure impact analysis techniques, are described in U.S. application Ser. No. 16/731,372, filed Dec. 31, 2019, the entire contents of which are hereby incorporated by reference.

Figure 4:
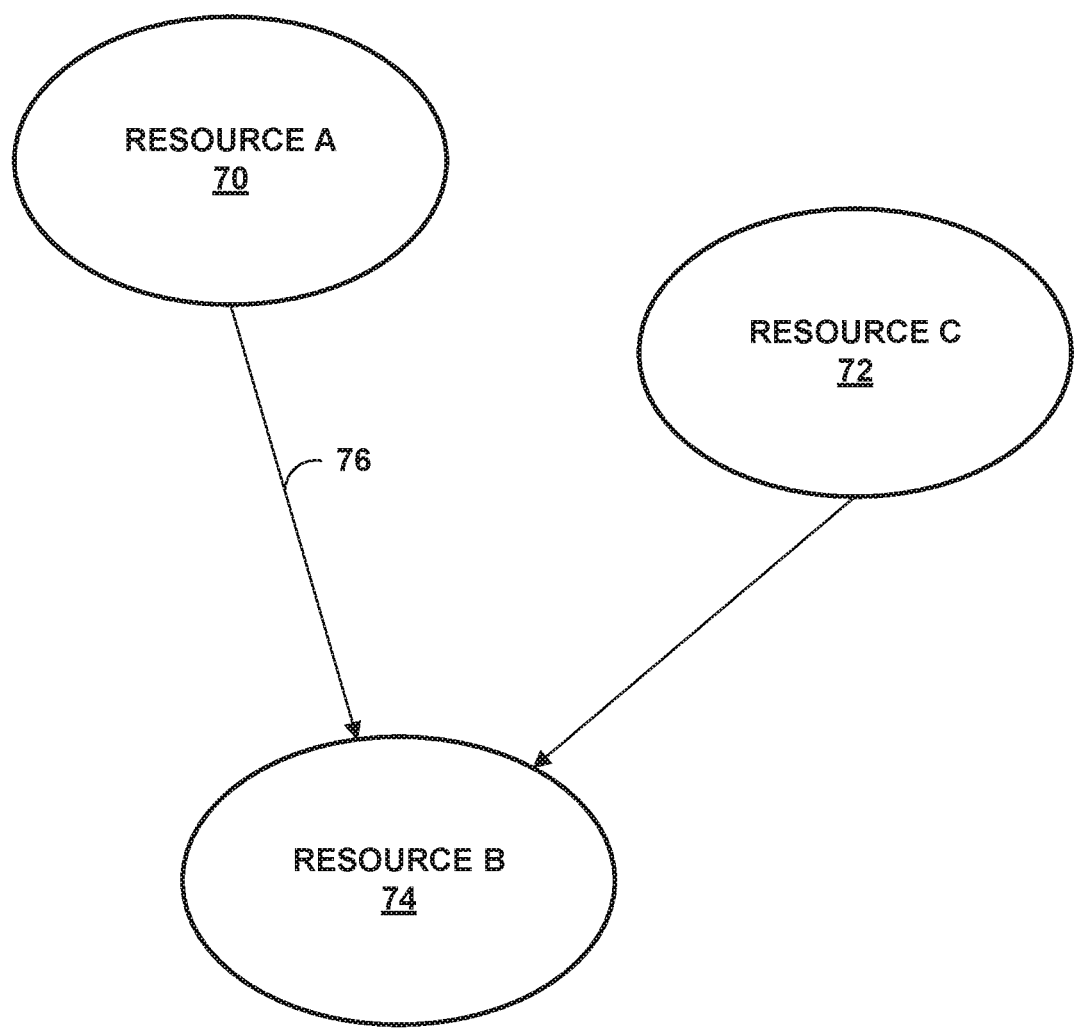
FIG. 4 is a conceptual diagram illustrating an example portion of a resource dependency mathematical model.

FIG. 4 is a conceptual diagram illustrating an example portion of a resource dependency mathematical model. In this example, the resource dependency mathematical model includes resource A node 70, resource C node 72, and resource B node 74. As per the resource dependency mathematical model, if resource A uses resource B (as shown by edge 76 from resource A node 70 to resource B node 74), management module 24 determines dependencies in inverse order. The following mathematical model may be provided:

Dependency (Resource): [List of Resources]
For the example of FIG. 4: Dependency (ResourceB)→ [ResourceA, ResourceC]

Referring again to FIG. 2, management module 24 may build the resource dependency mathematical model of dependency model 42 after adding and updating dependency edges of the resources, as discussed above. Management module 24 may then populate the resource dependency mathematical model as {key, value} pairs. Here, the key element represents dependent resources, and the value element is a list of referred resources. For every update, management module 24 may update the inverse dependency map accordingly.

Management module 24 may also perform resource synchronization. In network 2 (FIG. 1), resources may be added, updated, or deleted accordingly. Management module 24 may synchronize these changed resources in the model. Management module 24 may perform the pipeline to seamlessly account for the updated (e.g., added, updated, or deleted) resources. Management module 24 may also account for resource persistence by fetching existing resources based on the playbook and generating a difference (delta) relative to the existing resources. During the resource association stage, management module 24 may update associations for updated resources. During the resource dependency mathematical model stage, management module 24 may update the inversed dependencies.

As discussed above, controller device 10 may be (or interact with) a domain controller that was previously deployed in a customer network, and may already maintain resources in a local model. Controller device 10 may, in this scenario, be configured to synchronize resources from a domain specific controller to common resource databases.

Resources may be modeled as shown in the following example:

resource interface {
type device-resource;
keys [interface-name];
synopsis "Interface model";
description "This model captures the Interface information";
field interface-name {.>>>>Fields in the model
type string;
description "Interface Name";
}
field mtu {
type integer;
description "MTU";
}
discovery-rule-settings {>>>discovery rules
Rule controller.rule;
}
}

In the example above, "controller.rule" contains adapter details. Using the adapter, management module 24 may fetch required resources.

Management module 24 may determine resources that are discovered from an external controller and populate relations and the mathematical model for these resources. Management module 24 may further pass these resources through the pipeline, to build the mathematical model for these resources as well.

A network and network resources model may be as described below, and per Clemm et al., "A YANG Data Model for Network Topologies," IETF RFC 8345, March 2018, available at tools.ietf.org/html/rfc8345. The network data model enables the definition of network hierarchies, or network stacks (i.e., networks that are layered on top of each other) and maintenance of an inventory of nodes contained in the network. The network data model also provides information to describe the topology information. Specifically, it may add the concept of "links" and "termination points" to describe how nodes in a network are connected to each other. The network data model introduces vertical layering relationships between networks that can be augmented to cover both network inventories and network/service topologies.

Figure 5:
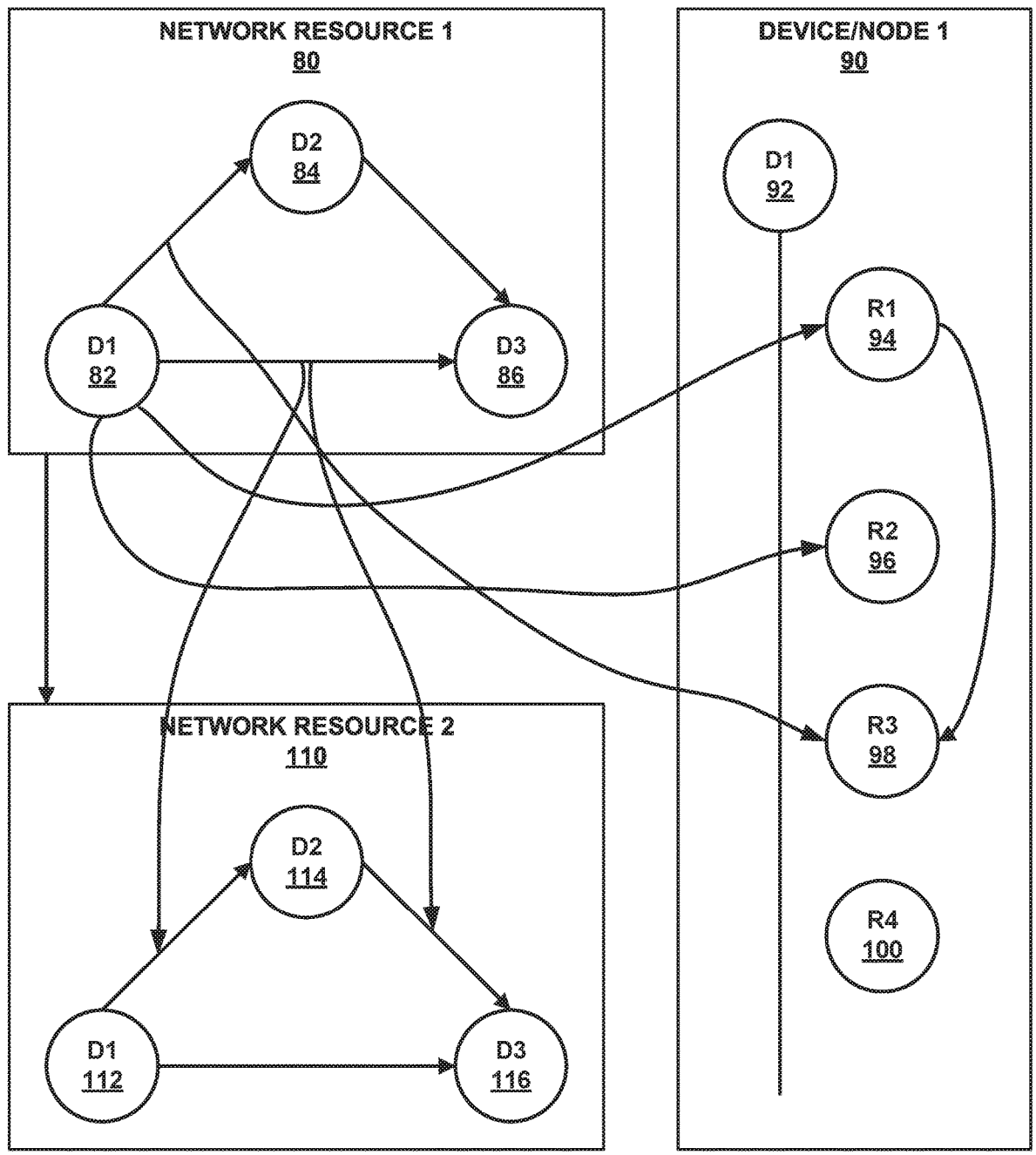
FIG. 5 is a conceptual diagram illustrating an example discovered network data model.

FIG. 5 is a conceptual diagram illustrating an example discovered network data model. In this example, the discovered network data model includes network resource 1 80, network resource 2 110, and device/node 1 90. Network resource 1 80 includes nodes D1 82, D2 84, and D3 86. Device/node 1 90 includes nodes D1 92, R1 94, R2 96, R3 98, and R4 100. Network resource 2 110 includes nodes D1 112, D2 114, and D3 116.

In this example, node D1 82 has reference edges to nodes D2 84, D3 86, R1 94, and R3 98, while node D2 has a reference edge to node D3 86. Similarly, node D1 112 has reference edges to nodes D2 114 and D3 116, while node D2 114 has a reference edge to node D3 116. Furthermore, node R1 has a reference edge to node R3 98. Moreover, the reference edge from node D1 82 to node D2 84 itself has a reference edge to node R3 98. Similarly, the reference edge from node D1 82 to node D3 86 has reference edges to the reference edge from node D1 112 to node D2 114, and from node D2 114 to node D3 116. Additionally, network resource 1 80 has a reference edge to network resource 2 110.

In this manner, the model of FIG. 5 includes network hierarchies, i.e., network stacks, demonstrating networks that are layered on top of each other.

Figure 6:
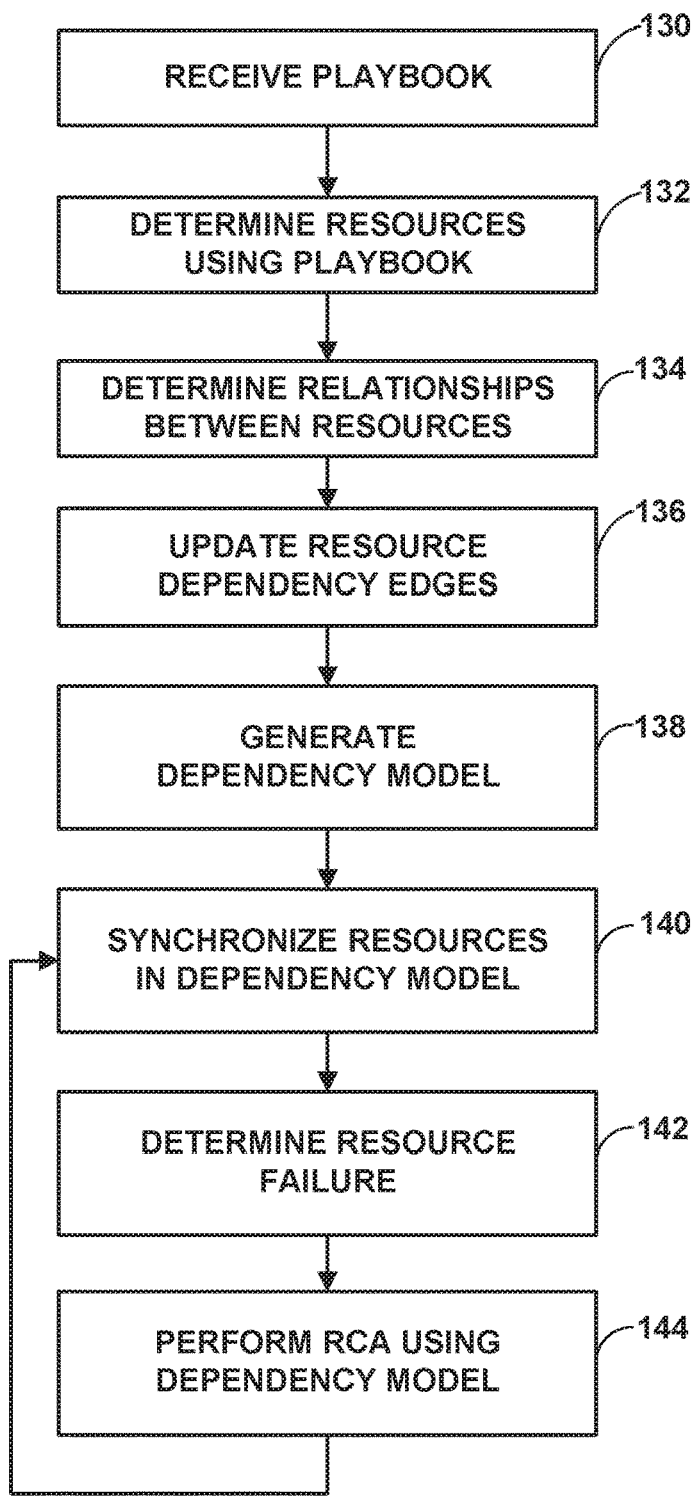
FIG. 6 is a flowchart illustrating an example method for constructing a resource dependency mathematical model and using the model to perform root cause analysis (RCA) according to the techniques of this disclosure.

FIG. 6 is a flowchart illustrating an example method for constructing a resource dependency mathematical model and using the model to perform root cause analysis (RCA) according to the techniques of this disclosure. In this example, controller device 10 (FIGS. 1 and 2) receives a playbook (130) including data representing a set of resource definitions, resource discovery rules, and a resource merge strategy, e.g., as discussed above.

Controller device 10 may then determine resources of a network using the playbook (132). For example, controller device 10 may generate a database model as a graph and add nodes to the graph corresponding to the resources and edges between the nodes. In particular, controller device 10 may discover the resources according to the resource definitions, discovery rules, and merge strategy of the playbook. Controller device 10 may further determine whether the resources are transient or not, and handle resources differently when they are transient vs. non-transient.

Controller device 10 may also determine relationships between the resources (134). For example, controller device 10 may determine whether the resources have a parent-child relationship or a contains relationship. Controller device 10 may update resource dependency edges (136) in the graph accordingly, e.g., by defining the edges as either contains edges (i.e., parent-child edges) or dependency edges. Controller device 10 may use the merge strategy rule when determining the dependent resources to add or delete the dependency edges between the nodes representing the resources. Thus, controller device 10 may generate the dependency model (138).

Furthermore, controller device 10 may monitor the network for modifications to the resources, e.g., to detect resource additions, updates, and deletions. Controller device 10 may further determine whether such modifications correspond to transient resources or not. Controller device 10 may also update the dependency model, i.e., nodes and edges of the graph, to synchronize the resources in the dependency model (140) accordingly.

At some point, controller device 10 may detect that a resource has failed (142). In response, controller device 10 may perform a root cause analysis (RCA) using the dependency model (144) to identify a root cause of the failed resource. In general, controller device 10 may trace the failure back through resources on which the failed resource depends to ultimately identify the resource that caused the failure. For example, failure of a network tunnel (e.g., an LSP) may be traced back to the failure of a network interface of a particular device.

In this manner, the method of FIG. 6 represents an example of a method including determining, by a controller device that manages a plurality of network devices, resources provided by the network devices; determining, by the controller device, relationships between the resources according to a programmed merge strategy; constructing, by the controller device, a dependency model representing dependencies between the resources using the determined relationships; determining, by the controller device, that at least one of the resources has experienced a failure; and performing, by the controller device, root cause analysis using the dependency mathematical model to determine a root cause of the failure of the at least one of the resources.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   determining, by a controller device that manages a plurality of network devices, resources provided by the network devices, the resources comprising one or more hardware units of the network devices, software units of the network devices, or network services provided by the network devices;
   determining, by the controller device, relationships between the resources according to a programmed merge strategy;
   constructing, by the controller device, a dependency model representing dependencies between the resources using the determined relationships, wherein constructing the dependency model comprises performing a resource management stage including, for each of the resources:
      determining whether the resource is transient:
         when the resource is not transient, retrieving existing resources of a playbook, comparing the resource with the existing resources, creating or updating a node for the resource, and forming an updated resource ID list to include the created or updated node; and
         when the resource is transient, determining a parent/child ID for the resource:
   determining, by the controller device, that at least one of the resources has experienced a failure; and
   performing, by the controller device, a root cause analysis using the dependency model to determine a root cause of the failure of the at least one of the resources.

2. The method of claim 1, further comprising receiving data defining the playbook representing a set of resource definitions, resource discovery rules, and the programmed merge strategy, wherein determining the resources comprises determining the resources using the resource definitions, the resource discovery rules, and the programmed merge strategy of the playbook.

3. The method of claim 1, wherein constructing the dependency model comprises:
   constructing one or more nodes each respectively representing one of the resources;
   and constructing edges between the nodes representing the dependencies between the resources.

4. The method of claim 3, wherein each of the edges comprises one of a dependency edge or a parent-child edge.

5. The method of claim 1, wherein constructing the dependency model comprises:
   using an updated resource ID list to determine the resources for which the dependencies have changed;
   executing the programmed merge strategy to add or delete dependency edges between the resources according to the dependencies; and
   forming an updated associations list.

6. The method of claim 1, further comprising:
   determining that one or more of the resources have been added, updated, or deleted; fetching the existing resources;
   determining one or more differences between the existing resources and the one or more resources that have been added, updated, or deleted;
   updating associations for the one or more resources that have been added, updated, or deleted; and
   updating inversed dependencies of the dependency model using the updated associations.

7. The method of claim 1, wherein determining the resources comprises determining the resources from an external controller device separate from the controller device.

8. A controller device that manages a plurality of network devices, the controller device comprising:
   a memory configured to store a dependency model representing dependencies between resources provided by the network devices and a programmed merge strategy, the resources comprising one or more hardware units of the network devices, software units of the network devices, or network services provided by the network devices; and
   one or more processors implemented in circuitry and configured to:
      determine the resources provided by the network devices;
      determine relationships between the resources according to the programmed merge strategy;
      construct the dependency model using the determined relationships, wherein to construct the dependency mode, the one or more processors are configured to perform a resource management stage to construct the dependency model, including, for each of the resources:
         determine whether the resource is transient:
            when the resource is not transient, retrieve existing resources of a playbook, compare the resource with existing resources, create or update a node for the resource, and form an updated resource ID list to include the created or updated node; and
            when the resource is transient, determine a parent/child ID for there source:
      determine that at least one of the resources has experienced a failure; and
      perform a root cause analysis using the dependency model to determine a root cause of the failure of the at least one of the resources.

9. The controller device of claim 8, wherein the one or more processors are further configured to receive data defining the playbook representing a set of resource definitions, resource discovery rules, and the programmed merge strategy, wherein the one or more processors are configured to determine the resources using the resource definitions, the resource discovery rules, and the programmed merge strategy of the playbook.

10. The controller device of claim 8, wherein to construct the dependency model, the one or more processors are configured to:
    construct one or more nodes each respectively representing one of the resources; and
    construct edges between the nodes representing the dependencies between the resources.

11. The controller device of claim 10, wherein each of the edges comprises one of a dependency edge or a parent-child edge.

12. The controller device of claim 8, wherein to construct the dependency model, the one or more processors are configured to:

use an updated resource ID list to determine the resources for which the dependencies have changed;

execute the programmed merge strategy to add or delete dependency edges between the resources according to the dependencies; and form an updated associations list.

13. The controller device of claim 8, wherein the one or more processors are further configured to:

determine that one or more of the resources have been added, updated, or deleted; fetch the existing resources;

determine one or more differences between the existing resources and the one or more resources that have been added, updated, or deleted;

update associations for the one or more resources that have been added, updated, or deleted; and update inversed dependencies of the dependency model using the updated associations.

14. The controller device of claim 8, wherein the one or more processors are configured to determine the resources from an external controller device separate from the controller device.

15. A non-transitory computer-readable storage medium having stored thereon instructions that, when executed, cause a processor of a controller device that manages a plurality of network devices to:

determine resources provided by the network devices, the resources comprising one or more hardware units of the network devices, software units of the network devices, or network services provided by the network devices;

determine relationships between the resources according to a programmed merge strategy;

construct a dependency model representing dependencies between the resources using the determined relationships, wherein the instructions that cause the processor to construct the dependency model comprise instructions that cause the processor to perform a resource management stage including, for each of the resources: determining whether the resource is transient:

when the resource is not transient, retrieving existing resources of a playbook, comparing the resource with existing resources, creating or updating anode for the resource, and forming an updated resource ID list to include the created or updated node; and when the resource is transient, determining a parent/child ID for the resource; determine that at least one of the resources has experienced a failure; and perform a root cause analysis using the dependency model to determine a root cause of the failure of the at least one of the resources.

16. The non-transitory computer-readable storage medium of claim 15, further comprising instructions that cause the processor to receive data defining the playbook representing a set of resource definitions, resource discovery rules, and the programmed merge strategy, wherein the instructions that cause the processor to determine the resources comprise instructions that cause the processor to determine the resources using the resource definitions, the resource discovery rules, and the programmed merge strategy of the playbook.

17. The non-transitory computer-readable storage medium of claim 15, wherein the instructions that cause the processor to construct the dependency model comprise instructions that cause the processor to:

construct one or more nodes each respectively representing one of the resources;

and constructing edges between the nodes representing the dependencies between the resources, wherein each of the edges comprises one of a dependency edge or a parent-child edge.

18. The non-transitory computer-readable storage medium of claim 15, further comprising instructions that cause the processor to:

determine that one or more of the resources have been added, updated, or deleted; fetch the existing resources;

determine one or more differences between the existing resources and the one or more resources that have been added, updated, or deleted;

update associations for the one or more resources that have been added, updated, or deleted; and update inversed dependencies of the dependency model using the updated associations.

* * * * *